(12) United States Patent
Erickson et al.

(10) Patent No.: US 12,505,048 B2
(45) Date of Patent: Dec. 23, 2025

(54) MEMORY MODULE WITH MEMORY-OWNERSHIP EXCHANGE

(71) Applicant: Rambus Inc., San Jose, CA (US)

(72) Inventors: Evan Lawrence Erickson, Chapel Hill, NC (US); Taeksang Song, San Jose, CA (US); Christopher Haywood, Fernandina Beach, FL (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/812,262

(22) Filed: Aug. 22, 2024

(65) Prior Publication Data

US 2025/0103508 A1 Mar. 27, 2025

Related U.S. Application Data

(60) Provisional application No. 63/584,653, filed on Sep. 22, 2023.

(51) Int. Cl.
*G06F 12/1009* (2016.01)
*G06F 12/02* (2006.01)
*G06F 13/16* (2006.01)

(52) U.S. Cl.
CPC ...... *G06F 12/1009* (2013.01); *G06F 12/0292* (2013.01); *G06F 13/1673* (2013.01)

(58) Field of Classification Search
CPC .............. G06F 12/1009; G06F 12/0292; G06F 13/1673; G06F 12/1072
See application file for complete search history.

(56) References Cited

U.S. PATENT DOCUMENTS

| | | |
|---|---|---|
| 7,143,206 B2 | 11/2006 | Oda et al. |
| 9,176,671 B1 * | 11/2015 | Smith ................... G06F 3/068 |
| 11,403,011 B1 | 8/2022 | Gunda et al. |
| 11,567,803 B2 | 1/2023 | Haywood et al. |
| 2011/0231598 A1 | 9/2011 | Hatsuda |
| 2013/0013877 A1 | 1/2013 | Tian |
| 2018/0276145 A1 * | 9/2018 | Tsirkin ................ G06F 9/45558 |
| 2019/0171387 A1 * | 6/2019 | Willhalm ............ G06F 12/0246 |
| 2020/0133677 A1 * | 4/2020 | Wallach .............. G06F 12/1441 |
| 2020/0241906 A1 * | 7/2020 | Tsirkin ................ G06F 12/1441 |
| 2021/0200667 A1 * | 7/2021 | Bernstein ............. G06F 3/0688 |
| 2021/0390066 A1 | 12/2021 | Haywood et al. |
| 2022/0413753 A1 | 12/2022 | Lee |
| 2023/0138817 A1 | 5/2023 | Miller et al. |
| 2023/0161599 A1 | 5/2023 | Erickson |

(Continued)

OTHER PUBLICATIONS

Bowman et al., "Explaining CXL Memory Pooling and Sharing," https://www.computeexpresslink.org/post/explaining-cxl-memory-pooling-and-sharing, May 21, 2021 (4 pages).

*Primary Examiner* — Sean D Rossiter
(74) *Attorney, Agent, or Firm* — Silicon Edge Law Group LLP; Arthur J. Behiel

(57) ABSTRACT

Described are computational systems in which hosts share pooled memory on the same memory module. A memory buffer with access to the pooled memory manages which regions of the memory are allocated to the different hosts such that memory regions, and thus the data they contain, can be exchanged between hosts. Unidirectional or bidirectional data exchanges between hosts swap regions of equal size so the amount of memory allocated to each host is not changed as a result of the exchange.

21 Claims, 3 Drawing Sheets

(56) References Cited

U.S. PATENT DOCUMENTS

| | | |
|---|---|---|
| 2023/0163964 A1 | 5/2023 | Erickson |
| 2024/0089099 A1* | 3/2024 | Tsirkin ................. H04L 9/0891 |
| 2024/0256459 A1* | 8/2024 | Subrahmanyam .. G06F 12/0882 |
| 2025/0117138 A1* | 4/2025 | Erickson ............... G06F 3/0673 |

* cited by examiner

MEMORY MODULE WITH MEMORY-OWNERSHIP EXCHANGE

BACKGROUND

A data center is a dedicated space or facility where organizations house their critical IT infrastructure, including servers, storage systems, and networking equipment. These centers serve as centralized repositories and processing hubs for data, enabling businesses and other entities to store, manage, process, and access vast amounts of data efficiently.

Compute Express Link (CXL) is a high-speed interconnect that's designed to enhance data center performance by providing a coherent interface between CPUs and other devices such as accelerators, memory buffers, and smart I/O devices. The capability for cross-host memory sharing with full coherency resolution can significantly boost performance, especially for workloads where multiple devices or hosts work in tandem or on shared data sets. Maintaining memory coherency across host is also important in scenarios where rapid data sharing is essential, like artificial-intelligence or machine-learning workloads or real-time analytics.

BRIEF DESCRIPTION OF THE DRAWINGS

The accompanying drawings are illustrative and not limiting. The left-most digit(s) of a reference number identifies the figure in which the reference number first appears. The same numbers are used throughout the figures to reference like features and components.

DETAILED DESCRIPTION

Figure 1:
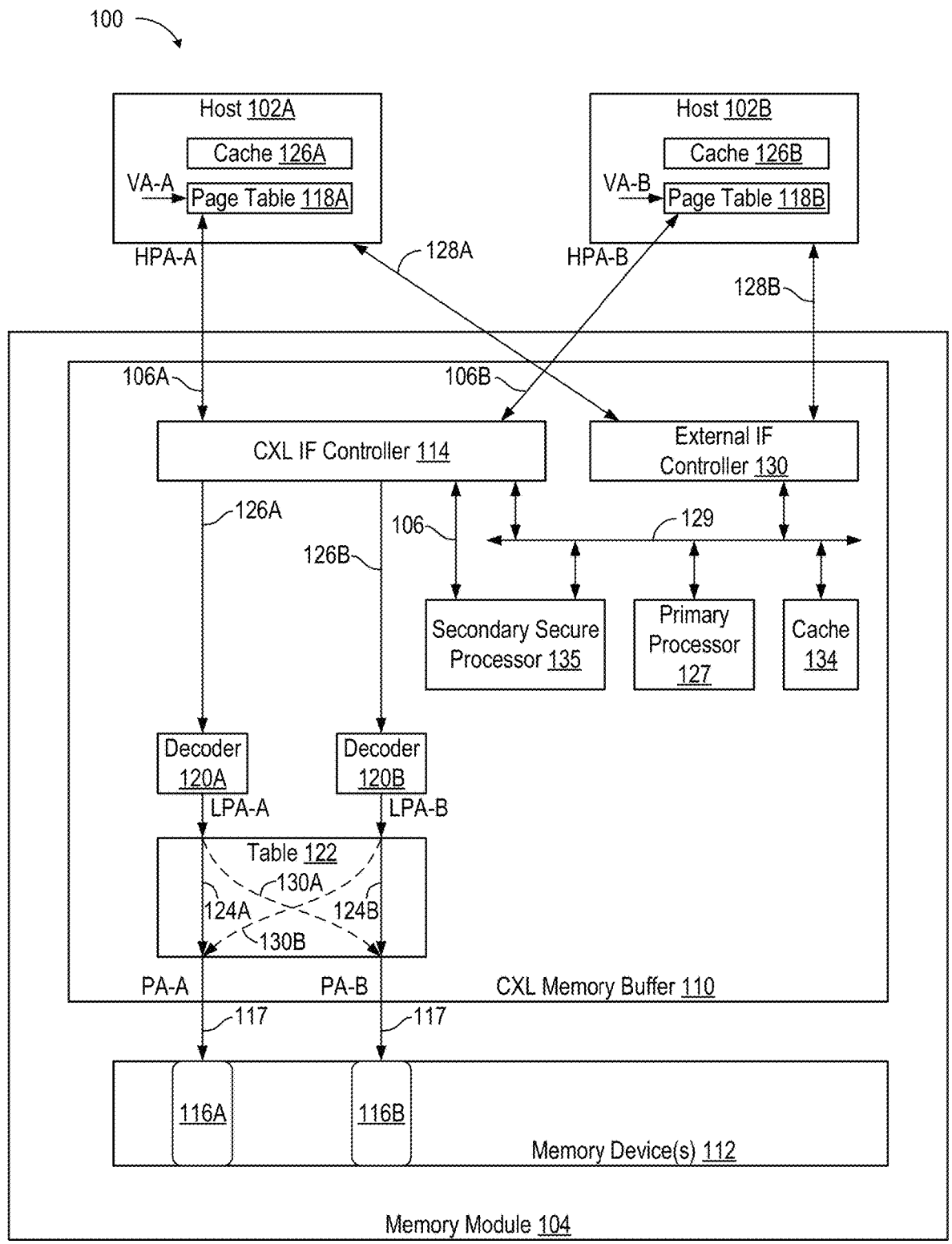
FIG. 1 depicts a computational system 100 in which two hosts (e.g. virtual machines or hypervisors) 102A and 102B share pooled memory on a memory module 104 in a manner that supports fast and efficient inter-host and intra-host transfers of available data.

FIG. 1 depicts a computational system 100 in which two hosts (e.g. virtual machines or hypervisors) 102A and 102B share pooled memory on a memory module 104 in a manner that supports fast and efficient inter-host and intra-host bidirectional and unidirectional data communication. A memory buffer 110 with access to memory 112 manages which memory regions are allocated to hosts 102A and 102B such that ownership of the memory regions, and thus the data they contain, can be exchanged between hosts. The exchanged memory regions are of equal size so the amount of memory 112 allocated to each host remains the same after an exchange. Memory buffer 110 relieves higher-level systems, like fabric managers or hypervisors, from otherwise relatively slow processes for managing data transfers and coherence. Exchanging access to memory regions storing data without transferring the data between physical address spaces also saves valuable time and energy, particularly in data-intensive applications. Data can be communicated between hosts unidirectionally by exchanging a blank memory region for one storing the data to be communicated.

System 100 supports live virtual-machine migration between servers. A virtual machine, a software-based representation of a physical computer, can be moved from one physical server to another without moving the representation, and thus without having to shut the virtual machine down. Such moves can thus be made for maintenance, load balancing, or other operational reasons with little or no interruption of service. Keeping the data subject to inter-host and intra-host transfers on one module also improves security. The data can remain encrypted and inaccessible to unauthorized entities, including data centers that provide computational infrastructure. System 100 thus supports operational efficiency, speed, and security.

Modern operating systems (OSs) use a concept of virtual memory, where software running on each of hosts 102A and 102B sees a continuous space of addresses (virtual addresses, VA) that the OS then maps to physical addresses in memory 112. This abstraction helps in efficient memory management, security, and multitasking. When one of hosts 102A and 102B launches a program, the OS allocates chunks of virtual memory to it. These chunks are then mapped to physical addresses. In this example, physical memory regions 116A and 116B in memory 112 are allocated to hosts 102A and 102B, respectively. The OS also instantiates address tables, page tables 118A and 118B in this example, for hosts 102A and 102B. Each address table is a data structure used by the OS to track the relationship between virtual addresses VA and host physical addresses HPA. In the example of FIG. 1, the identifiers for signals and elements associated with host 102A and 102B likewise respectively terminate with "A" and "B"; thus, the virtual addresses and host physical addresses for host 102A are VA-A and HPA-A, respectively.

Each of hosts 102A and 102B instantiates a respective decoder 120A and 120B that translates host physical addresses HPAs to logical addresses LPAs. LPAs are, from the host perspective, physical addresses. They are termed "logical" addresses, however, because memory buffer 110 instantiates an exchange table 122 with private table entries 124A and 124B that map local physical addresses LPA-A and LPA-B to actual physical addresses PA-A and PA-B that point to identically sized regions 116A and 116B in the physical address space of memory 112. There is one decoder 120 per host 102, in this embodiment, each decoder to convert respective HPAs to a common LPA address space on module 104. Exchange table 122 is a first-level page table in this example, the top-most table in a page-entry hierarchy. Other embodiments support more or fewer levels of page tables, and the operation of decoders 120A and 120B can be combined with that of exchange table 122.

The following example assumes hosts 102A and 102B are to exchange access to allocated memory regions 116A and 116B. This exchange involves a zero-copy swap of regions 116A and 116B so the amount of memory allocated to each host remains the same post exchange. Hosts 102A and 102B include respective caches 126A and 126B to cache data from respective allocated regions 116A and 116B. Cached data can differ from that in memory 112, so caches 126A and 126B are flushed before regions 116A and 116B are reassigned between hosts to ensure the most recent copy of the data to be reassigned is stored by memory module 104.

Hosts 102A and 102B issue memory-exchange instructions to memory buffer 110 to specify the data regions they wish to exchange, regions 116A and 116B in this example. Memory buffer 110 updates page-table entries in exchange table 122 to direct logical physical address LPA-A to physical address PA-B and logical physical address LPA-B to physical address PA-A, an exchange illustrated using a pair of crossed, dashed arrows 130A and 130B. Thereafter, host 102A will have access to region 116B using the same logical physical addresses LPA-A that had been used to access region 116A. Likewise, host 102B will have access to region 116A. This manner of data communication simplifies the management of memory resources and ensures that host 102A does not require complex and time-consuming operations to reclaim or adjust memory after an exchange. Changes to decoders 120A and 120B are not required, so hosts 102A and 102B are able to use the same HPAs as before the exchange. Maintaining the host physical addresses HPAs means that page tables 118A and 118B need not be updated. Post exchange, virtual addresses VA-A and VA-B that previously mapped to one portion of memory 112 now map to another. Memory buffer 110 can confirm this exchange via responses to hosts 102A and 102B. Reassigning memory regions 116, and thus the data contained therein, between hosts does not require updates to host-side page-tables 118A and 118B, as the memory module 104 now maps accesses to host physical addresses HPA-A and HPA-B to respective physical addresses PA-B and PA-A.

When exchanging ownership of regions 116A and 116B, memory buffer 110 can facilitate caching to the newly assigned host. For example, the data in region 116B can be immediately written to cache 126A, essentially pre-fetched by host 102A, leading to reduced latency when host 102A accesses the reassigned data. In some embodiments, memory buffer 110 can pull the data meant for exchange directly into a buffer-side cache 134 at addresses designated for the receiving host or hosts. Caching data in buffer 110 reduces access latency when a receiving host or hosts later accesses the data.

Cache 134 can be used as a mechanism for exchange without updating the address translation (e.g. page tables) within buffer 110. For example, by copying the data in region 116A to buffer-side cache 134 so that data is accessible by host 102B, module 104 is not doing a "zero copy" data transfer, but nor does buffer 110 have to copy data between regions 116A and 116B in memory 112 to make the data available to host 102B. Instead, buffer-side cache 134 acts as a data buffer that allows module 112 to manage exchanges by cross-copying data from a memory region assigned to one host into cache 134 at an address the other host can access. Buffer 110 marks the affected cachelines in cache 134 dirty. When this cached data is eventually evicted from buffer-side cache 134, the dirty cachelines are written back into memory 112, completing the swap of data without address-translation changes. Access to the exchanged memory regions may be restricted during this data movement. However, this method has an advantage in that it avoids the need to update page-table entries. Instead, the data meant for exchange is duplicated temporarily within the cache.

In the embodiment of FIG. 1, memory buffer 110 is a "Compute Express Link" (CXL) device—an integrated circuit—that can implement secure key exchange. CXL is a high-speed memory interconnect intended to boost the performance of data-center computing tasks. CXL is an industry standard for connecting host processors to accelerators, memory, and other computing resources. CXL memory buffer 110 allows two or more computing entities (like hosts 102A and 102B) to access and share pooled memory addresses on the same module 104. Buffer 110 also works with hosts to provide full coherency resolution, meaning that data entries are maintained as consistent across caches and memory devices.

In CXL, cross-host sharing is possible with full coherency resolution either using coarse resolution (e.g., huge-page) or fine-granularity metadata tracking (e.g., cacheline MESI states). CXL has specific hardware-level commands or features to ensure memory coherence. MESI is an abbreviation for cacheline states Modified, Exclusive, Shared, and Invalid. Each of hosts 102A and 102B can interface with memory module 104 primarily through a respective CXL link 106 that supports protocols consistent with the CXL standards, such as CXL.io and CXL.mem. For some embodiments that involve CXL Type 2 devices, an additional CXL.cache protocol may also be utilized.

Memory module 104 supports a distributed CXL memory architecture that allows hosts 102A and 102B to access one or more memory devices of memory 112 via CXL buffer device 110. CXL buffer device 110 can be a system-on-chip (SoC) and the memory devices of memory 112 Dynamic Random Access Memory (DRAM) devices, non-volatile memory devices, or a combination of volatile and non-volatile memory. Buffer 110 can include one or more memory controllers to manage the flow of data going to and from memory 112, memory controllers that can be adapted for different types and combinations memory devices.

Memory buffer 110 includes a host interface controller 114, in this instance an in-band CXL interface controller. Control circuitry within memory buffer 110 cooperates with controller 114 to provide a transfer path between in-band CXL links 106 and memory 112. CXL interface controller 114 is connected to decoders 120A and 120B via respective buses 126A and 126B. In one embodiment, memory buffer 110 includes double data rate (DDR) control circuitry to manage DRAM memory devices via interface 117. A primary processor 127 is responsible for establishing an SoC configuration, responding to mailbox message host sends, sending interrupt messages to the host, etc. In accordance with CXL standards, primary processor 127 also controls CXL interface controller 114 but is prevented from directly accessing memory 112 in most circumstances to enhance security.

A secondary secure processor 135 is connected to primary processor 127 via an internal system bus 129. Secondary secure processor 135, e.g. a hardware root of trust (RoT), can carry out cryptographic operations on behalf of primary processor 127. For one CXL-related embodiment, secondary secure processor 135 is responsible for encryption/decryption in hardware, as necessary, and may include secure storage for cryptographic keys. Secure processor 135 can also participate in device attestation operations, confirming that a given device is what it says it is through certificate verification and or other identity confirmation techniques. For some embodiments, secure processor 220 exclusively controls the secure boot flow for CXL memory buffer 110.

Communication between memory module 104 and hosts 102A and 102B is enhanced through the use of side-band channels or links 128 that are independent of CXL links 106. Commands to exchange data ownership can be sent over either CXL links 106 or side-band links 128. To support use of the side-band channel, CXL buffer device 110 employs additional external interface circuitry in the form of a side-band external interface controller 130, which may support link protocols such as SMBus, I2C and/or I3C. Links 128 provides an auxiliary channel for CXL buffer device 110 to communicate with hosts 102A and 102B should CXL links 106 fail. For example, host 102A may communicate with CXL buffer device 110 without interfering with CXL-related signal transfers on the respective CXL link 106. In one embodiment, side-band links 128 can couple memory module 104 to some other device besides hosts 102A and 102B, such as a management server and fabric manager. In such an embodiment, CXL links 106 and side-band links 128 can each couple memory module 104 to different devices. Portions of host messages can be encrypted, such as included in a secured SPDM message and/or using MCTP encapsulation. In some embodiments, primary processor 127 extracts encrypted portions and conveys them to secure processor 135 (e.g., using an internal API call) for decryption using e.g. an SPDM session key.

When buffer 110 encrypts data for storage in memory 112, secure processor 135 manages the encryption keys, either for distinct regions of the physical memory space (HPA, LPA, or PA) or for distinct hosts/virtual machines. When data to be exchanged is encrypted, memory buffer 110 handles the process of exchanging ownership of memory regions while managing the associated encryption keys. Key management is particularly important when module 104 is used in support of a Trusted Execution Environment (TEE) where security and data integrity are crucial. In some embodiments, data may be re-encrypted during an exchange operation while in other embodiments data is decrypted into the buffer-side cache 134 and re-encrypted with the correct key after eviction. Finally, in some embodiments the encryption keys may be exchanged with the encrypted data, requiring no explicit re-encryption or decryption to transfer the data.

While the embodiment of FIG. 1 illustrates exchanges between hosts, similar exchanges can be accomplished by or within a single host, as between virtual machines running on the same server or servers. Exchanges can convey access to data bidirectionally or unidirectionally. For bidirectional data exchanges, memory buffer 110 swaps regions 116A and 116B with their constituent data between host 102A and 102B. For unidirectional exchanges, a region 116 of memory 112 allocated to the receiving host prior to the transfer is erased before the region is assigned to the transferring host. Using FIG. 1 to illustrate a unidirectional transfer of data in region 116A from host 102A to host 102B, for example, memory buffer 110 erases the contents of region 116B before updating exchange table 122 in the manner of a bidirectional data exchange. Each host 102A and 102B thus retains access to the same amount of memory post transfer, but only host 102A gains access to additional data as a result of the exchange. The symmetry of memory-region exchange, applied to bidirectional or unidirectional data communication, simplifies memory management because e.g. there is no need to update host-side page tables. For unidirectional data communication, the receiving host can provide access to any appropriately sized region 116 (e.g., a region 116 that is empty or includes data of little or no use to the receiving host). Memory buffer 110, during the command setup for a unidirectional data communication, can be required to zero the region 116 the receiving host is giving up.

Figure 2:
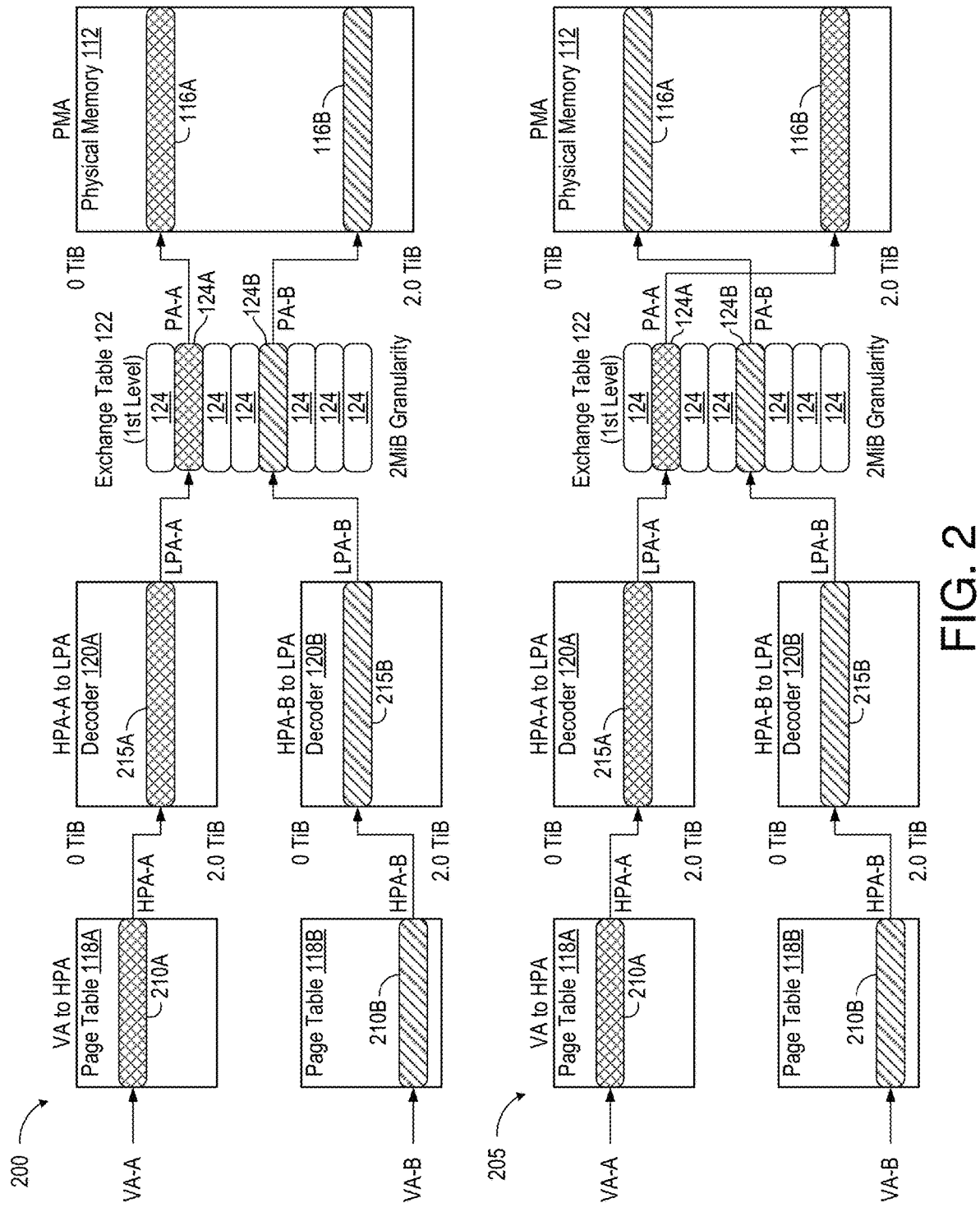
FIG. 2 includes a pair of block diagrams 200 and 205 illustrating the data structures instantiated in memory 112 of FIG. 1 before and after a data transfer between host 102A and host 102B.

FIG. 2 includes a pair of block diagrams 200 and 205 illustrating the data structures instantiated in memory module 104 of FIG. 1 before and after a data exchange between host 102A and host 102B. Beginning with diagram 200, the condition of memory 112 before data exchange, page table 118A (118B) includes a page-table entry (PTE) 210A (210B) converting a virtual address VA-A (VA-B) to a host physical address HPA-A (HPA-B). Decoder 120A (120B) includes a decoder entry 215A (215B) that converts host physical address HPA-A (HPA-B) to a logical physical address LPA-A (LPA-B). In this example, decoder 120A (120B) has 2.0 TiB (Tebibyte) entries.

Exchange table 122 with page-table entries (PTEs) 124 includes one entry 124A (124B) corresponding to host 102A (102B) that translates local physical address LPA-A (LPA-B) to region 116A (116B) within physical memory 112. The size of regions 116 are a multiple of a specified allocation granularity, which is given as 2 MiB (Mebibyte) in this embodiment. However, if regions 116 are not a perfect multiple of this granularity, additional page table (PT) levels can be added to accommodate the irregularity. The HPAs used by the hosts to write data for exchanges are the same HPAs that are used to access the received data. This consistency eliminates the need for any updates to page tables 118 after the exchange, simplifying the data exchange process.

Diagram 205 illustrates the condition of memory 112 after an exchange of the data in region 116A from host 102A to host 102B. The only difference is that exchange table 122 is edited such that PTE 124A and PTE 124B point to regions 116B and 116A, respectively. Host 102B thus now has access to the data in region 116A, effectively transferring that data from host 102A to host 102B without moving the data and without modifying host-side page table entries (PTEs) 118A and 118B. Swapped regions 116A and 116B are of the same size, ensuring neither of hosts 102A and 102B has a net gain or loss of allocated memory. In this example, neither the host-side PTEs nor the module-side HPA to LPA decoders are modified during the ownership-exchange process.

Figure 3:
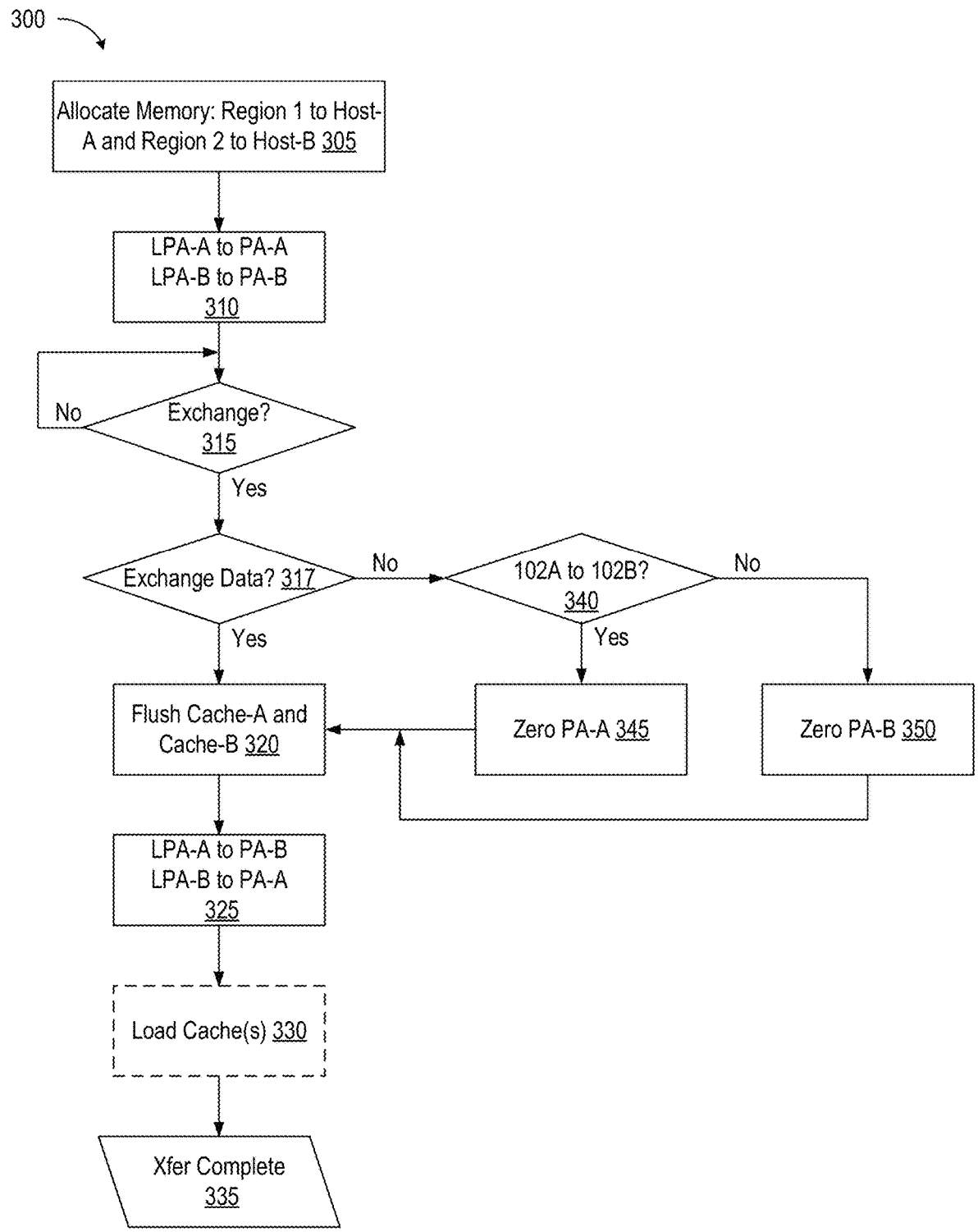
FIG. 3 is a flowchart 300 illustrating how memory regions are exchanged between hosts in support of bidirectional and unidirectional data communication.

FIG. 3 is a flowchart 300 illustrating how memory regions are exchanged between hosts in support of bidirectional and unidirectional data communication. Flowchart 300 references elements of FIG. 1 for ease of illustration but is not limited to the depicted system.

The process begins when the memory system allocates regions 116A and 116B to hosts 102A and 102B, respectively (305). The mechanics of memory allocation are well known so a detailed discussion is omitted. Memory buffer 110 adds entries 124A and 124B to provide hosts 102A and 102B with indirect references to physical addresses PA-A and PA-B of respective allocated memory regions 116A and 116B (310).

Host 102A and 102B access respective regions 116A and 116B as normal. Each host uses its respective cache or a hierarchy of caches to reduce the average time to access data from memory 112. Though shown as a single cache 126 in each host 102, the cache hierarchy typically consists of L1, L2, and sometimes L3 (or even L4 in some architectures) caches. When a host 102 requires data that is not present in its cache 126, the host fetches it from memory 112. When that host then writes data to the cached addresses, it typically writes to the cache first (especially in write-back cache architectures). Later, the cache will write this so-called "dirty" data back to memory 112, either after some time or when the effected address is needed for other data.

Per decision 315, hosts 102A and 102B use memory module 104 to process data and instructions within respective regions 116A and 116B until memory buffer 110 receives a memory-exchange request. Hosts 102A and 102B message memory buffer 110, in some cases using one or more vendor-defined messages, to specify the memory regions they wish to exchange. Exchanges of memory regions can exchange the data therein—a bidirectional exchange of data—or can assign data available to just one host to the other host—a unidirectional assignment of data. Per decision 317, for a bidirectional exchange of data memory buffer 110 works with hosts 102A and 102B to flush respective caches 126A and 126B such that regions 116A and 116B contain the most-recent data (320). Next, memory buffer 110 updates entries in exchange table 122 to direct logical physical address LPA-A to physical address PA-B and logical physical address LPA-B to physical address PA-A (325). Thereafter, host 102A will have access to region 116B using the same logical physical addresses LPA-A that had been used to access region 116A. Likewise, host 102B will have access to region 116A. Memory buffer 110 can confirm this transfer via responses to hosts 102A and 102B.

In an optional step 330, memory 112 injects the data from the newly assigned regions 116A and 116B into respective host-side caches 126B and 126A or into e.g. regions of cache 134 available to the receiving host or hosts. Data that has been assigned from one host to another is likely to be accessed soon after the exchange. Prefetching data from a newly exchanged region can therefore save time. Other processes on data within newly assigned regions can also be performed while or before the data is made available to the recipient host. For example, data can be processed to add error-checking codes (like checksums or CRC values) to ensure data integrity, or an intermediate processing step might translate or convert data to a format or protocol more suitable to a recipient host. Buffer 110 issues a notification 335 to one or both hosts 102A and 102B indicating that the exchange is complete.

Returning to decision 317, exchanges of memory regions that do not exchange data, but rather assign data from one host to another without a reciprocal assignment, are termed "unidirectional." Per decision 340, if a unidirectional exchange calls for data assigned to host 102B to be made available to host 102A, the region 116 referenced by logical physical address LPA-A is zeroed (345) before the process moves to step 320. If a unidirectional exchange calls for data assigned to host 102A to be made available to host 102B (decision 340 is "No"), the region 116 referenced by logical physical address LPA-B is zeroed (350) before the process moves to step 320.

In the foregoing description and in the accompanying drawings, specific terminology and drawing symbols are set forth to provide a thorough understanding of the present invention. In some instances, the terminology and symbols may imply specific details that are not required to practice the invention. Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A memory buffer comprising:
   an interface controller to receive at least one memory-exchange instruction from a first host and a second host, the memory-exchange instruction specifying a first address allocated to the first host and a second address allocated to the second host; and
   a memory controller coupled to the interface controller, the memory controller to:
      maintain an address table with a first page-table entry directing the first address to a first memory region and the second address to a second memory region; and
      responsive to the memory-exchange instruction, update the first page-table entry to direct the first address to the second memory region and the second address to the first memory region.

2. The memory buffer of claim 1, wherein the first memory region and the second memory region are identically sized.

3. The memory buffer of claim 1, the memory buffer to cache data from the first memory region to the second host responsive to the memory-exchange instruction.

4. The memory buffer of claim 3, the memory buffer to cache second data from the second memory region to the first host responsive to the memory-exchange instruction.

5. The memory buffer of claim 1, wherein the first host includes a first cache and the second host includes a second cache, wherein the memory buffer moves data from the first cache to the first memory region responsive to the memory-exchange instruction before updating the first page-table entry.

6. The memory buffer of claim 1, wherein the interface controller and the memory controller are integrated separate from a memory.

7. The memory buffer of claim 1, the memory controller further to process data in the first memory region responsive to the memory-exchange instruction.

8. The memory buffer of claim 7, the memory controller to change a format of the data in the first memory region from a first format for the first host to a second format of the second host.

9. A memory module comprising:
   a memory buffer having a host interface and a memory controller, the host interface to receive a memory-exchange instruction from at least one of a first host and a second host; and
   memory connected to the memory controller;
   the memory buffer to:
      maintain an exchange table with a first page-table entry directing the first host to a first region in the memory and a second page-table entry directing the second host to a second region in the memory; and
      responsive to the memory-exchange instruction, update the first page-table entry to direct the first host to the second region of the memory and the second host to the first region of the memory.

10. The memory module of claim 9, wherein the first region of the memory and the second region of the memory are identically sized.

11. The memory module of claim 9, the memory buffer to cache data from the first region of the memory responsive to the memory-exchange instruction.

12. The memory module of claim 11, the memory buffer to cache second data from the second region of the memory to the first host responsive to the memory-exchange instruction.

13. The memory module of claim 9, wherein the first host includes a first cache and the second host includes a second cache, wherein the memory buffer moves data from the first cache to the first region of the memory responsive to the memory-exchange instruction before updating the first page-table entry.

14. The memory module of claim 9, wherein the host interface and the memory controller are integrated separate from the memory.

15. The memory module of claim 9, wherein the memory comprises dynamic, random-access memory devices.

16. A method comprising:
   allocating a first region of physical memory on a memory module to a first host and a second region of the physical memory on the memory module to a second host;
   instantiating, on the memory module, a first address table with a first host address for the first host and a second address table with a second host address for the second host;

instantiating, on the memory module, an exchange address table translating the first host address to a first physical address of the physical memory and the second host address to a second physical address of the physical memory; and responsive to a memory-exchange instruction from the first host, updating the exchange address table to translate the first host address to the second physical address of the physical memory and the second host address to the first physical address of the physical memory.

17. The method of claim 16, wherein the first host address identifies the first region of physical memory, the second host address identifies the second region of the physical memory, and the first region of physical memory and the second region of the physical memory are identically sized.

18. The method of claim 16, further comprising caching data from the first region of the physical memory responsive to the memory-exchange instruction.

19. The method of claim 18, wherein the caching includes copying the data from the first region of the physical memory to the second host.

20. The method of claim 16, further comprising processing data from the first region of the physical memory responsive to the memory-exchange instruction.

21. The method of claim 20, the processing to change a format of the data in the first region of the physical memory from a first format for the first host to a second format for the second host.

* * * * *